(12) United States Patent
Purdy et al.

(10) Patent No.: US 10,329,476 B2
(45) Date of Patent: Jun. 25, 2019

(54) NON-REGULATED SYNTHETIC ACID COMPOSITIONS FOR USE AS ALTERNATIVES TO CONVENTIONAL ACIDS IN THE OIL AND GAS INDUSTRY

(71) Applicant: FLUID ENERGY GROUP LTD., Calgary (CA)

(72) Inventors: Clay Purdy, Medicine Hat (CA); Darren Thatcher, High River (CA); Jon Garner, Stony Plain (CA); Bruce Ulmer, Stony Plain (CA); Alexander David Jamieson, Calgary (CA)

(73) Assignee: FLUID ENERGY GROUP LTD., Calgary, Alberta (CA)

( * ) Notice: Subject to any disclaimer, the term of this patent is extended or adjusted under 35 U.S.C. 154(b) by 0 days.

(21) Appl. No.: 15/160,467

(22) Filed: May 20, 2016

(65) Prior Publication Data

US 2016/0347994 A1    Dec. 1, 2016

(30) Foreign Application Priority Data

May 28, 2015    (CA) ..................................... 2892877

(51) Int. Cl.
| | | |
|---|---|---|
| *C09K 8/74* | (2006.01) | |
| *C09K 8/528* | (2006.01) | |
| *C23F 11/04* | (2006.01) | |
| *E21B 37/06* | (2006.01) | |
| *E21B 43/25* | (2006.01) | |
| *E21B 43/26* | (2006.01) | |

(52) U.S. Cl.
CPC ................ *C09K 8/74* (2013.01); *C09K 8/528* (2013.01); *C23F 11/04* (2013.01); *E21B 37/06* (2013.01); *E21B 43/25* (2013.01); *E21B 43/26* (2013.01); *C09K 2208/32* (2013.01)

(58) Field of Classification Search
CPC .......... C09K 8/74; C09K 3/1463; C09K 8/42; C09K 8/725; C09K 3/1436; C09K 8/035; C09K 8/40; C09K 8/52; C09K 8/03; C09K 8/584; C09K 8/602; C09K 13/00; C09K 2205/24; C09K 2208/02; C09K 2208/08; C09K 2208/30; C09K 2208/32; C09K 5/045; C09K 8/10; C09K 8/528; C09K 8/5758; C09K 8/62; C09K 8/64; C09K 8/68; C09K 8/685; C09K 8/805; C09K 8/90; C09K 8/905

See application file for complete search history.

(56) References Cited

U.S. PATENT DOCUMENTS

| | | |
|---|---|---|
| 4,402,852 A | 9/1983 | Young |
| 5,672,279 A | 9/1997 | Sargent et al. |
| 6,147,042 A | 11/2000 | Yata et al. |
| 7,938,912 B1 | 5/2011 | MacDonald |
| 2007/0164258 A1* | 7/2007 | Emerson ................ C02F 5/086 252/387 |
| 2009/0221455 A1* | 9/2009 | Ke ........................... C09K 8/54 507/261 |
| 2009/0260659 A1* | 10/2009 | Choczaj ............... C11D 3/3409 134/28 |
| 2011/0251426 A1* | 10/2011 | Childs ..................... B01D 9/00 562/493 |
| 2013/0260649 A1 | 10/2013 | Thomson |

* cited by examiner

*Primary Examiner* — Kumar R Bhushan
(74) *Attorney, Agent, or Firm* — Heslin Rothenberg Farley & Mesiti, P.C.

(57) ABSTRACT

A synthetic acid composition for use in oil industry activities comprising urea and methanesulphonic acid in a molar ratio of not loss than 1.0:1, a metal iodide or iodate and an alcohol or derivative thereof.

14 Claims, No Drawings

NON-REGULATED SYNTHETIC ACID COMPOSITIONS FOR USE AS ALTERNATIVES TO CONVENTIONAL ACIDS IN THE OIL AND GAS INDUSTRY

CROSS-REFERENCE TO RELATED APPLICATIONS

This application claims priority benefit of Canadian Patent Application Serial No. 2,892,877, filed May 28, 2015, the disclosure of which is hereby incorporated by reference herein in its entirety.

FIELD OF THE INVENTION

This invention relates to compositions for use in performing various applications in the oil and gas industry, more specifically to synthetic acid compositions as alternatives to conventional acids.

BACKGROUND OF THE INVENTION

In the oil and gas industry, stimulation with an acid is performed on a well to increase or restore production. In some instances, a well initially exhibits low permeability, and stimulation is employed to commence production from the reservoir. In other instances, stimulation is used to further encourage permeability and flow from an already existing well that has become under-productive.

Acidizing is a type of stimulation treatment which can performed above or below the reservoir fracture pressure in an effort to restore or increase the natural permeability of the reservoir rock. Acidizing is achieved by pumping acid into the well to dissolve typically limestone, dolomite and calcite cement between the sediment grains of the reservoir rocks.

There are three major types of acid applications: matrix acidizing, fracture acidizing, and breakdown acidizing (pumped prior to a fracturing pad or cement operation in order to assist with formation breakdown (reduce fracture pressures, increased feed rates), as well as clean up left over cement in the well bore or perforations. A matrix acid treatment is performed when acid is pumped into the well and into the pores of the reservoir formation below the fracture pressure. In this form of acidization, the acids dissolve the sediments and mud solids that are inhibiting the permeability of the rock, enlarging the natural pores of the reservoir (wormholing) and stimulating flow of hydrocarbons. While matrix acidizing is done at a low enough pressure to keep from fracturing the reservoir rock, fracture acidizing involves pumping highly pressurized acid into the well, physically fracturing the reservoir rock and etching the permeability inhibitive sediments. This type of acid treatment forms channels or fractures through which the hydrocarbons can flow, in addition to forming a series of wormholes.

There are many different mineral and organic acids used to perform an acid treatment on wells. The most common type of acid employed on wells to stimulate production is hydrochloric acid (HCl), which is useful in stimulating carbonate reservoirs.

Some of the major challenges faced in the oil and gas industry from using hydrochloric acid include the following: extremely high levels of corrosion (which is countered by the addition of 'filming' type corrosion inhibitors that are typically themselves toxic and harmful to humans, the environment and equipment) reactions between acids and various types of metals can vary greatly but softer metals, such as aluminum and magnesium, are very susceptible to major effects causing immediate damage. Hydrochloric acid produces Hydrogen chloride gas which is toxic (potentially fatal) and corrosive to skin, eyes and metals. At levels above 50 ppm (parts per million) it can be Immediately Dangerous to Life and Health (IDHL). At levels from 1300-2000 ppm death can occur in 2-3 minutes.

The inherent environmental effects (organic sterility, poisoning of wildlife etc.) of acids in the event of an unintended or accidental release on surface or downhole into water aquifers or other sources of water are devastating which can cause significant pH reduction of such and can substantially increase the toxicity and could potentially cause a mass culling of aquatic species and potential poisoning of humans or livestock and wildlife exposed to/or drinking the water. An unintended release at surface can also cause a hydrogen chloride gas cloud to be released, potentially endangering human and animal health. This is a common event at large storage sites when tanks split or leak. Typically if near the public, large areas need to be evacuated post event. Because of its acidic nature, hydrogen chloride gas is also corrosive, particularly in the presence of moisture.

The inability for acids and blends of such to biodegrade naturally without neutralizing the soil results in expensive cleanup-reclamation costs for the operator should an unintended release occur. Moreover, the toxic fumes produced by mineral and organic acids are harmful to humans/animals and are highly corrosive and/or potentially explosive. Transportation and storage requirements for acids are restrictive and taxing in such that you must haul the products in acid approved tankers or intermediate bulk containers (IBC) that are rated to handle such corrosive products. As well, the dangers surrounding exposure by personnel handling the blending of such corrosive/dangerous products limits their use/implementation.

Another concern is the potential for exposure incidents on locations due to high corrosion levels of acids causing storage container failures and/or deployment equipment failures i.e. coiled tubing or treatment iron failures caused by high corrosion rates (pitting, cracks, pinholes and major failures). Other concerns include: downhole equipment failures from corrosion causing the operator to have to execute a work-over and replace down hole pumps, tubing, cables, packers etc.; inconsistent strength or quality level of mineral and organic acids; potential supply issues based on industrial output levels; high levels of corrosion on surface pumping equipment resulting in expensive repair and maintenance levels for operators and service companies; the requirement of specialized equipment that is purpose built to pump acids greatly increasing the capital expenditures of operators and service companies; the inability to source a finished product locally or very near its end use; and transportation/onsite storage difficulties.

Typically, acids are produced in industrial areas of countries located far from oil and gas applications, up to 10 additives can be required to control various aspects of the acids properties adding to complications in the handling and shipping logistics. Having an alternative that requires minimal additives is very advantageous.

Large price fluctuations of conventional mineral and organic acids based on industrial output capacity causes end users the inability to establish long term cost controls of their respective budgets.

Extremely high corrosion and reaction rates with temperature increases can cause conventional acids to "spend/react or become neutral" prior to achieving its desired effect such as penetrating an oil or gas formation to increase the wormhole "pathway" effectively to allow the petroleum product to flow freely to the surface. As an example, hydrochloric acid or a "mud acid" can be utilized in an attempt to free stuck drill pipe in some situations. Prior to getting to the required depth to dissolve the formation that has caused the pipe/tubing to become stuck many acids spend or neutralize due to increased bottom hole temperatures and increased reaction rate, so it is advantageous to have an alternative that spends or reacts more methodically allowing the slough to be treated with a solution that is still active, allowing the pipe/tubing to be pulled free.

When used to treat scaling issues on surface due to water contamination, conventional acids are exposed to human and mechanical devices as well as expensive pumping equipment causing increased risk for the operator and corrosion effects that damage equipment and create hazardous fumes. When mixed with bases or higher pH fluids, acids will create a high amount of thermal energy (exothermic reaction) causing potential safety concerns and equipment damage, acids typically need to be blended with fresh water (due to their intolerance of highly saline water, causing potential precipitation of minerals) to the desired concentration requiring companies to pre-blend off-site as opposed to blending on-site with field/produced water thereby increasing costs associated with transportation.

Conventional mineral acids used in a pH control situation can cause rapid degradation of certain polymers/additives requiring increased loadings or additional chemicals to be added to counter these negative effects. Many offshore areas of operations have very strict regulatory rules regarding the transportation/handling and deployment of acids causing increased liability and costs for the operator. When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel) causing the acids to become very corrosive and resulting in damage to downhole equipment/tubulars. Conventional acids are also very destructive to most elastomers found in the oil and gas industry such as those found in blow out preventers (BOP's)/downhole tools/packers/submersible pumps/seals etc. Having to deal with spent acid during the back flush process is also very expensive as these acids typically are still at a low pH and remain toxic. It is advantageous to have an acid blend that can be exported to production facilities through pipelines that once spent or applied, is commonly close to a neutral pH greatly reducing disposal costs/fees.

Acids perform many actions in the oil and gas industry and are considered necessary to achieve the desired production of various petroleum wells, maintain their respective systems and aid in certain functions (i.e. freeing stuck pipe). The associated dangers that come with using acids are expansive and tasking to mitigate through controls whether they are chemically or mechanically engineered Eliminating or even simply reducing the negative effects of acids while maintaining their usefulness is a struggle for the industry. As the public demand for the use of cleaner/safer/greener products increases, companies are looking for alternatives that perform the required function without all or most of the drawbacks associated with the use of conventional acids.

U.S. Pat. No. 4,402,852 discloses compositions containing 5 to 75% of urea, 5 to 85% of sulfuric acid and from 5 to 75% of water. These compositions are said to have reduced corrosiveness to carbon steels.

US patent no. 2013/0260649 A1 discloses a cleaning composition containing urea, methanesulfonic acid, a corrosion inhibitor, a surfactant and a surface of at least one metal. This cleaning composition is said to remove surface contaminants from commercial and household surfaces, said surface contaminants comprising scale, carbonates, rust, and combinations thereof.

U.S. Pat. No. 6,147,042 discloses compositions comprising a polyphosphoric acid-urea condensate or polymer which results from the reaction of orthophosphoric acid and urea used in the removal of etching residue containing organometal residues.

U.S. Pat. No. 7,938,912 discloses compositions containing hydrochloric acid, urea, a complex substituted keto-amine-hydrochloride, an alcohol, an ethoxylate and a ketone for use to clean surfaces having cementitious compositions. U.S. Pat. Nos. 8,430,971 and 8,580,047 disclose and claim compositions containing specific amounts of hydrochloric acid (55% by wt); urea (42% by wt), a complex substituted keto-amine-hydrochloride (0.067% by wt); propargyl alcohol (0.067% by wt); an ethoxylated nonylphenyl (0.022% by wt); methyl vinyl ketone (0.022% by wt); acetone (0.0022% by wt); and acetophenone (0.0022% by wt) for use in specific oil industry applications, namely oil drilling and hydraulic fracturing.

U.S. Pat. No. 5,672,279 discloses a composition containing urea hydrochloride prepared by mixing urea and hydrochloric acid. Urea hydrochloride is used to remove scale in hot water boilers and other industrial equipment such as papermaking equipment. Scale is caused by the presence of calcium carbonate which is poorly soluble in water and tends to accumulate on surfaces and affect equipment exposed to it.

Several operations in the oil industry expose fluids to very high temperatures (some over 200° C.), the compositions used in these various operations need to withstand these high temperatures without losing their overall effectiveness. These compositions must be capable of being used in operations over a wide range of temperatures while not affecting the equipment with which it comes in contact.

Synthetic acid compositions are mostly applicable in the cleaning industry. However, such compositions require the additional of a number of various chemical compounds which are dangerous in their undiluted states. The physical process to make such cleaning compositions involves multiple steps of mixing, blending and dilution. The present invention proposes the removal of certain chemicals used which would rationalize the process to make the compositions of the present invention and therefore render the manufacturing process safer from a production point of view. Moreover, it was discovered that the composition according to the present invention exhibits stability for operations at elevated temperatures (above 65° C.) and therefore makes them useful in the oil and gas industry. The composition according to the present invention can ideally be used in various oilfield operations, such as: spearhead breakdown acid, acid fracturing operations, Injection-disposal well treatments, scale removal treatments (surface and subsurface, equipment, pipelines, facilities), formation filter cake removal, tubing pickling, matrix acid squeezes and soaks, cement squeeze breakdowns, fluid pH control, stuck pipe operations, and coiled tubing acid washes, soaks, squeezes.

Therefore, the present invention answers the need for both a simpler/safer manufacturing process and abridged synthetic acid compositions for use in high temperature/volume applications such as various operations in the oilfield.

Consequently, there is still a need for compositions for use in the oil industry which can be used over this range of applications which can decrease a number of the associated dangers/issues typically associated with conventional acid applications to the extent that these acid compositions are considered much safer for handling on worksites.

SUMMARY OF THE INVENTION

Compositions according to the present invention have been developed for the oil and gas industry and its associated applications, by targeting the problems of corrosion, logistics/handling, human/environmental exposure and formation/fluid compatibilities.

It is an object of the present invention to provide a synthetic acid composition which can be used over a broad range of applications in the oil and gas industry and which exhibit advantageous properties over known compositions.

According to one aspect of the present invention, there is provided a synthetic acid composition which, upon proper use, results in a very low corrosion rate of oil and gas industry tubulars/equipment.

According to another aspect of the present invention, there is provided a synthetic acid composition for use in the oil industry which is considered non-regulated for transportation purposes, by road, rail, sea and air.

According to another aspect of the present invention, there is provided a synthetic acid composition for use in the oil industry which is readily biodegradable.

According to another aspect of the present invention, there is provided a synthetic acid composition for use in the oil industry which has a controlled spending (reacting) nature that is near linear as temperature increases, non-fuming, non-toxic, and has a highly controlled manufacturing process ensuring consistent end product strength. According to a preferred embodiment of the invention, there is provided a synthetic acid composition exhibiting good long-term stability while not requiring the addition of a surfactant.

According to another aspect of the present invention, there is provided a synthetic acid composition for use in the oil industry which has a pH below 1.

According to another aspect of the present invention, there is provided a synthetic acid composition for use in the oil industry which has minimal exothermic reactivity upon dilution or reaction.

According to another aspect of the present invention, there is provided a synthetic acid composition for use in oil industry activities, said composition comprising: urea and methanesulphonic acid (MSA) in a molar ratio of not less than 0.1:1; and, optionally, a metal iodide or iodate.

According to another aspect of the present invention, there is provided a synthetic acid composition for use in oil industry activities, said composition comprising: urea and methanesulphonic acid (MSA) in a molar ratio of not less than 0.1:1; optionally a metal iodide or iodate; and/or an alcohol or derivative thereof. Preferably, the urea and MSA are in a molar ratio of not less than 0.5:1. More preferably, the urea and MSA are in a molar ratio of not less than 1.0:1.

According to a preferred embodiment of the present invention, the metal iodide or iodate is cuprous iodide.

According to another preferred embodiment of the present invention, the metal iodide or iodate is potassium iodide.

According to yet another preferred embodiment of the present invention, the metal iodide or iodate is sodium iodide.

According to another preferred embodiment of the present invention, the metal iodide or iodate is lithium iodide.

Preferably, the alcohol or derivative thereof is an alkynyl alcohol or derivative thereof. More preferably, the alkynyl alcohol or derivative thereof is propargyl alcohol or a derivative thereof.

According to a preferred embodiment of the present invention, the alkynyl alcohol or derivative thereof is present in a concentration ranging from 0.01 to 2.0% w/w, preferably from 0.01 to 0.5% w/w. More preferably, the alkynyl alcohol or derivative thereof is present in a concentration of 0.2% w/w.

According to a preferred embodiment of the present invention, the metal iodide is present in a concentration ranging from 100 to 10000 ppm, preferably from 100 to 5000 ppm. Preferably, the metal iodide is present in a concentration of 1000 ppm.

According to another aspect of the present invention, there is provided a use of a synthetic acid composition in the oil industry to stimulate formations.

According to an aspect of the present invention, there is provided a synthetic acid composition for use in the oil industry to provide a product that is much less corrosive to mild steel and aluminum.

According to yet another aspect of the present invention, there is provided a use of a synthetic acid composition in the oil industry to assist in reducing breakdown pressures during downhole pumping operations.

According to another aspect of the present invention, there is provided a use of a synthetic acid composition in the oil industry to treat wellbore filter cake post drilling operations.

According to an aspect of the present invention, there is provided a use of a synthetic acid composition in the oil industry to assist in freeing stuck pipe.

According to yet another aspect of the present invention, there is provided a use of a synthetic acid composition in the oil industry to descale pipelines and/or production wells.

According to another aspect of the present invention, there is provided a use of a synthetic acid composition in the oil industry to increase injectivity of injection wells.

According to yet another aspect of the present invention, there is provided a use of a synthetic acid composition in the oil industry to lower the pH of a fluid.

According to an aspect of the present invention, there is provided a use of a synthetic acid composition in the oil industry to remove undesirable scale on a surface selected from the group consisting of: equipment, wells and related equipment and facilities.

According to another aspect of the present invention, there is provided a use of a synthetic acid composition in the oil industry to fracture wells.

According to yet another aspect of the present invention, there is provided a use of a synthetic acid composition in the oil industry to complete matrix stimulations.

According to an aspect of the present invention, there is provided a use of a synthetic acid composition in the oil industry to conduct annular and bullhead squeezes and soaks.

According to another aspect of the present invention, there is provided a use of a synthetic acid composition in the oil industry to pickle tubing, pipe and/or coiled tubing.

According to another aspect of the present invention, there is provided a use of a synthetic acid composition in the oil industry to increase effective permeability of formations.

According to yet another aspect of the present invention, there is provided a use of a synthetic acid composition in the oil industry to reduce or remove wellbore damage.

According to an aspect of the present invention, there is provided a use of a synthetic acid composition in the oil industry to clean perforations.

According to another aspect of the present invention, there is provided a use of a synthetic acid composition in the oil industry to solubilize limestone, dolomite, calcite and combinations thereof.

According to another aspect of the present invention, there is provided a synthetic acid composition for use in the oil industry which has high salinity tolerance. A tolerance for high salinity fluids, or brines, is desirable for onshore and offshore acid applications. Conventional acids are normally blended with fresh water and additives, typically far offsite, and then transported to the area of treatment as a finished blend. It is advantageous to have an alternative that can be transported as a concentrate safely to the treatment area, then blended with a saline produced water or sea water greatly reducing the logistics requirement. A conventional acid system will precipitate salts/minerals heavily if blended with fluids of an excessive saline level resulting in formation plugging or ancillary damage inhibiting production and substantially increasing costs. Brines are also typically present in formations, thus having an acid system that has a high tolerance for brines greatly reduces the potential for formation damage or emulsions forming down-hole during or after product placement/spending occurs.

According to another aspect of the present invention, there is provided a synthetic acid composition for use in the oil industry which is immediately reactive upon contact/application.

According to another aspect of the present invention, there is provided a synthetic acid composition for use in the oil industry which results in less unintended near wellbore erosion due to the controlled reaction rate. This, in turn, results in deeper formation penetration, increased permeability, and reduces the potential for zonal communication during a typical 'open hole' mechanical isolation application treatment. As a highly reactive acid, such as hydrochloric acid, is deployed into a well that has open hole packers for isolation (without casing) there is a potential to cause a loss of near-wellbore compressive strength resulting in communication between zones or sections of interest as well as potential sand production, and fines migration. It is advantageous to have an alternative that will react with a much more controlled rate or speed, thus greatly reducing the potential for zonal communication and the above potential negative side effects of traditional acid systems.

According to another aspect of the present invention, there is provided a synthetic acid composition for use in the oil industry which provides a controlled and comprehensive reaction throughout a broad range of temperatures. Accordingly, the present invention would overcome drawbacks found in conventional compositions used in the oil and gas industry.

According to one aspect of the present invention, there is provided a synthetic acid composition for use in oil industry activities, said composition comprising:
  urea and methanesulphonic acid in a molar ratio of not less than 0.1:1;
  water;
  a metal iodide or iodate; and
  an alcohol or derivative thereof,
wherein no less than 97% of the weight of the composition is comprised of the water, the urea and the methanesulfonic acid. Preferably, 98% of the weight of the composition is comprised of the water, the urea and the methanesulfonic acid. More preferably, 98.9% of the weight of the composition is comprised of the water, the urea and the methanesulfonic acid.

DETAILED DESCRIPTION OF THE PREFERRED EMBODIMENTS

The description that follows, and the embodiments described therein, is provided by way of illustration of an example, or examples, of particular embodiments of the principles of the present invention. These examples are provided for the purposes of explanation, and not limitation, of those principles and of the invention.

According to an aspect of the invention, there is provided a synthetic acid composition comprising:
  urea and methanesulphonic acid in a molar ratio of not less than 0.1:1; preferably in a molar ratio not less than 0.5:1, more preferably in a molar ratio not less than 1.0:1;
  a metal iodide or iodates, preferably cupric iodide, potassium iodide, lithium iodide or sodium iodide; in an amount ranging from 0.01-1.0%, preferably from 0.01-0.5%, preferably in an amount of approximately 0.1%; potassium iodide is the preferred compound; and
  an alcohol or derivative thereof, preferably alkynyl alcohol, more preferably 2-Propyn-1-ol, compd. with methyloxirane; in an amount ranging from 0.05-2.0%, preferably from 0.05-1.0%, preferably in an amount of approximately 0.2%; 2-Propyn-1-ol, complexed with methyloxirane is the preferred component.

Urea and methanesulphonic acid (MSA) are the main components in terms of volume and weight percent of the composition of the present invention, and consists basically of carbonyl groups connecting with nitrogen and hydrogen ions. When added to methanesulphonic acid, there is a reaction that results in urea methanesulphonic acid. This reaction greatly reduces the hazardous effects of the methanesulphonic acid on its own, such as the fuming effects, the hygroscopic effects, and the highly corrosive nature. The excess nitrogen can also act as a corrosion inhibitor at higher temperatures. Urea and methanesulphonic acid is in a molar ratio of not less than 0.1:1; preferably in a molar ratio not less than 0.5:1, and more preferably in a molar ratio not less than 1.0:1. However, this ratio can be increased depending on the application.

It is preferable to add the urea at a molar ratio greater than 1 to the moles of MSA acid (or any acid). This is done in order to bind any available negatively charged ions, thereby creating a safer, more inhibited product. Preferably, the composition according to the present invention comprises 1.02 moles of urea per 1.0 moles of MSA. The urea-MSA also allows for a reduced rate of reaction when in the presence of carbonate-based materials. This again due to the stronger molecular bonds associated over what MSA acid traditionally displays. Further, since the composition according to the present invention is mainly comprised of urea (which is naturally biodegradable) and MSA (readily biodegradable), the product testing has shown that the urea MSA will maintain this same biodegradability function.

Alcohols and derivatives thereof, such as alkyne alcohols and derivatives and preferably 2-Propyn-1-ol, complexed with methyloxirane and derivatives thereof can be used as corrosion inhibitors. Propargyl alcohol itself is traditionally used as a corrosion inhibitor which works extremely well at low concentrations. It is however a very toxic/flammable chemical to handle as a concentrate, so care must be taken when exposed to the concentrate. In the composition according to the present invention, it is preferred to use 2-Propyn-1-ol, complexed with methyloxirane, as this is a much safer derivative to handle, non-regulated, and approved for use in North Sea Offshore Oilfield applications. This is a preferred embodiment of the present invention. In preferred embodiments of the present invention, 2-Propyn-1-ol, complexed with methyloxirane can be present in a range of from 0.01-0.5% wt/wt of the composition, preferably from 0.05-1.0%, preferably, it is present in an amount of approximately 0.2%. Potassium Iodide can be present in a range of 0.01-0.5%, preferably it is present in an amount of approximately 0.1% wt/wt composition.

Metal iodides or iodates such as potassium iodide, sodium iodide, cuprous iodide and lithium iodide can potentially be used as corrosion inhibitor intensifier. In fact, potassium iodide is a metal iodide traditionally used as corrosion inhibitor intensifier, however it is expensive, but works well. It is non-regulated, friendly to handle, and listed on the offshore PLONOR (Pose Little Or NO Risk) list as safe chemicals to the environment.

Example 1—Process to Prepare a Composition According to a Preferred Embodiment of the Invention Start with a 50% by weight solution of pure urea liquor. Add a 70% by weight solution of methanesulphonic acid while circulating until all reactions have completely ceased. Then add water followed by the 2-Propyn-1-ol, complexed with methyloxirane, and potassium iodide. Circulation is maintained until all products have been solubilized. Additional products can be added at this point depending on the necessity/application (anti sludge, demulsifier, etc.). Table 1 lists the components of the composition of Example 1, including their weight percentage as compared to the total weight of the composition and the CAS numbers of each component.

TABLE 1

Composition of Example 1

| Chemical | % Wt Composition | CAS# |
| --- | --- | --- |
| Water | 43.7% | 7732-18-5 |
| Urea | 22% | 57-13-6 |
| Methanesulphonic acid | 34% | 75-75-2 |
| 2-Propyn-1-ol, compd. with methyloxirane | 0.2% | 38172-91-7 |
| Potassium Iodide | 0.1% | 7681-11-0 |

The resulting composition of Example 1 is a clear, odourless liquid having shelf-life of greater than 1 year. It has a freezing point temperature of approximately minus 30° C. and a boiling point temperature of approximately 100° C. It has a specific gravity of 1.22±0.02. It is completely soluble in water and its pH is less than 1.

The composition is 100% readily biodegradable and is classified as an irritant according to the classifications for skin tests. The composition is non-fuming and has no volatile organic compounds nor does it have any BTEX levels above the drinking water quality levels. BTEX refers to the chemicals benzene, toluene, ethylbenzene and xylene. Toxicity testing was calculated using surrogate information and the LD50 was determined to be greater than 2000 mg/kg.

With respect to the corrosion impact of the composition on typical oilfield grade steel, it was established that it was clearly well below the acceptable corrosion limits set by industry for certain applications, such as spearhead applications or lower temperature scaling.

Corrosion Testing

The composition of Example 1 according to the present invention was exposed to corrosion testing. The results of the corrosion tests are reported in Table 2.

Samples of N80 grade steel were exposed to various synthetic acid solutions for periods of time ranging up to 24 hours at 90° C. temperatures. All of the tested compositions contained MSA and urea in a 1:1.02 ratio.

TABLE 2

Corrosion testing comparison between MSA-Urea and the composition of Example 1 at a 50% concentration on N80 coupons

| Composition | Initial wt. (g) | Final wt. (g) | Loss wt. (g) | Surface area (cm2) | Density (g/cc) | Run time (hours) | Mils/yr | mm/year | lb/ft$^2$ |
| --- | --- | --- | --- | --- | --- | --- | --- | --- | --- |
| MSA-No Urea | 38.672 | 33.393 | 5.279 | 28.922 | 7.86 | 6 | 13348.09 | 339.041 | 0.374 |
| MSA-No Urea | 38.672 | 33.237 | 5.435 | 28.922 | 7.86 | 24 | 3435.63 | 87.265 | 0.385 |
| MSA-Urea | 38.159 | 35.097 | 3.062 | 28.922 | 7.86 | 6 | 7742.35 | 196.656 | 0.217 |
| MSA-Urea | 38.159 | 34.956 | 3.203 | 28.922 | 7.86 | 24 | 2024.72 | 51.428 | 0.227 |
| Example #1 | 40.593 | 40.465 | 0.128 | 27.11 | 7.86 | 6 | 345.28 | 8.770 | 0.009 |
| Example #1 | 40.593 | 39.826 | 0.767 | 27.11 | 7.86 | 24 | 517.25 | 13.138 | 0.054 |

This type of corrosion testing helps to determine the impact of the use of such synthetic replacement acid composition according to the present invention compared to the industry standard (HCl blends or any other mineral or organic acid blends). The results obtained for the composition containing only MSA and MSA-urea were used as a baseline to compare the other compositions. Additionally, the compositions according to the present invention will allow the end user to utilize an alternative to conventional acids that has the down-hole performance advantages, transportation and storage advantages as well as the health, safety and environmental advantages. Enhancement in short/long term corrosion control is one of the key advantages of the present invention. The vast reduction in skin corrosiveness, the elimination of corrosive fumes, the controlled spending nature, and the high salt tolerance are some other advantages of compositions according to the present invention.

Corrosion Testing at Various Temperatures

Various compositions according to the present invention were tested for corrosion inhibition at various temperatures on N80 steel for an exposure period of 6 hours. Various levels of additives were used as well. The density of N80 steel was 7.86 g/cc and the surface area of the coupons was of 28.0884 cm$^2$. Table 3 lists the results of these corrosion tests.

TABLE 3

Corrosion Tests on N80 Steel

| Composition | Additives | Temp (° C.) | Initial wt. (g) | Final wt. (g) | Loss wt. (g) | Mils/yr | Mm/year | Lb/ft2 |
|---|---|---|---|---|---|---|---|---|
| MSA-UREA (100%) | 0.01% KI 0.25% PP | 90 | 49.6607 | 46.5343 | 3.126 | 8142.98 | 206.832 | 0.228 |
| MSA-UREA (50%) | 0.01% KI 0.25% PP | 90 | 51.3847 | 47.7592 | 3.626 | 9442.929 | 239.850 | 0.265 |
| MSA-UREA (100%) | 0.1% KI 1% PP | 90 | 49.4874 | 49.1985 | 0.289 | 752.4651 | 19.113 | 0.020 |
| MSA-UREA (50%) | 0.1% KI 1% PP | 90 | 49.772 | 48.565 | 1.207 | 3143.736 | 79.851 | 0.086 |
| MSA-UREA (50%) | 0.2% KI 2% PP | 150 | 49.6287 | 49.5766 | 0.052 | 135.699 | 3.447 | 0.004 |
| MSA-UREA (50%) | 0.2% KI 2% PP | 90 | 49.8465 | 49.6115 | 0.235 | 612.0779 | 15.547 | 0.017 |

PP signifies propyn-1-ol with methyloxirane
KI signifies Potassium Iodide

Corrosion Testing at Various Temperatures

Various compositions according to the present invention were tested for corrosion inhibition at various temperatures on N80 steel for an exposure period of 6 hours. Various levels of additives were used as well. The density of N80 steel was 7.86 g/cc and the surface area of the coupons was of 28.0884 cm$^2$. Table 4 lists the results of these corrosion tests.

TABLE 4

Corrosion Tests on N80 Steel

| Composition | Additives | Temp (° C.) | Initial wt. (g) | Final wt. (g) | Loss wt. (g) | Mils/yr | Mm/year | Lb/ft2 |
|---|---|---|---|---|---|---|---|---|
| MSA-UREA (100%) | 0.01% KI 0.25% PP | 90 | 49.6607 | 46.5343 | 3.126 | 8142.98 | 206.832 | 0.228 |
| MSA-UREA (50%) | 0.01% KI 0.25% PP | 90 | 51.3847 | 47.7592 | 3.626 | 9442.929 | 239.850 | 0.265 |
| MSA-UREA (100%) | 0.1% KI 1% PP | 90 | 49.4874 | 49.1985 | 0.289 | 752.4651 | 19.113 | 0.020 |
| MSA-UREA (50%) | 0.1% KI 1% PP | 90 | 49.772 | 48.565 | 1.207 | 3143.736 | 79.851 | 0.086 |
| MSA-UREA (50%) | 0.2% KI 2% PP | 150 | 49.6287 | 49.5766 | 0.052 | 135.699 | 3.447 | 0.004 |
| MSA-UREA (50%) | 0.2% KI 2% PP | 90 | 49.8465 | 49.6115 | 0.235 | 612.0779 | 15.547 | 0.017 |

PP signifies propyn-1-ol with methyloxirane
KI signifies Potassium Iodide

Example 2

A composition according to a preferred embodiment of the present invention was prepared similarly to Example 1. The components and their amounts are listed in Table 5.

TABLE 5

Composition of Example 2

| Chemical | % Wt Composition |
|---|---|
| Water | 42.9% |
| Urea | 22% |
| Methanesulphonic acid | 34% |
| 2-Propyn-1-ol, compd. with methyloxirane | 1% |
| Potassium Iodide | 0.1% |

Corrosion Testing on J55 Steel

Various compositions according to the present invention were tested for corrosion inhibition at various temperatures on J55 steel for an exposure period of 6 hours. Various levels of additives were used as well. The density of J55 steel was 7.86 g/cc and the surface area of the coupons was of 28.922 cm$^2$. Table 6 lists the results of these corrosion tests.

TABLE 6

Corrosion Tests on J55 Steel

| Composition | Additives | Temp (° C.) | Initial wt. (g) | Final wt. (g) | Loss wt. (g) | Mils/yr | Mm/year | Lb/ft2 |
|---|---|---|---|---|---|---|---|---|
| MSA-UREA (100%) | | 70 | 33.2466 | 31.0799 | 2.167 | 5478.557 | 139.155 | 0.154 |
| MSA-UREA (100%) | 0.1% KI 1% PP | 70 | 33.2353 | 33.1648 | 0.071 | 178.2611 | 4.528 | 0.005 |
| MSA-UREA (50%) | 0.1% KI 1% PP | 70 | 33.1332 | 33.0042 | 0.129 | 326.1798 | 8.285 | 0.009 |

PP signifies propyn-1-ol complexed with methyloxirane
KI signifies Potassium Iodide Solubility Testing The formulation of Example 2 was tested for dissolving ability. Its solubilising power (in kg per m$^3$) was assessed by exposing 50 ml of the compositions to chunks of calcium carbonate at a temperature of 23° C. for a period of up to 225 minutes. The results of the solubilising tests are reported in Table 7 below.

TABLE 7

Results of solubilising tests of CaCO$_3$ Chunks

| Composition | Initial Weight/g | Final Weight/g | Weight Loss/g | Total Solubility kg per m$^3$ |
|---|---|---|---|---|
| Example 2 | 20.0547 | 8.7824 | 11.2723 | 225 |
| Example 2 (diluted to 50%) | 20.2377 | 13.5926 | 6.6451 | 133 |

Aquatic Toxicity Testing

The biological test method that was employed was the Reference Method for Determining acute lethality using rainbow trout (1990—Environment Canada, EPS 1/RM/9— with the May 1996 and May 2007 amendments).

The Trout 96 hour Acute Test (WTR-ME-041) was performed at 5 different concentrations of compositions (62.5, 125, 250, 500 and 1000 ppm) one replicate per treatment, ten fish per replicate.

The test results indicate that at concentrations of the formulation of Example 1 of up to and including 500 ppm there was a 100% survival rate in the fish sample studied. This is an indicator that the formulation of Example 1 demonstrates a very acceptable environmental safety profile.

Dermal Exposure Test

The objective of this study was to evaluate the dermal irritancy and corrosiveness of the composition of Example 2, following a single application to human skin. To assess the safety upon spillage on human skin, a few drops of the synthetic acid according to a preferred embodiment of the present invention and a control composition (MSA—70%) were applied to the skin on the back of the hand of a test individual. The hands were not covered and remained exposed to the compositions for a period of up to one hour. The exposed skin was subsequently washed with soap and visual assessment of the exposed area was done 24 hours after the start of the exposure. The results of this dermal test are reported in Table 8.

TABLE 8

Dermal Exposure Tests
MSA-UREA (100%) vs Methanesulfonic acid

| Hours from exposure | MSA-UREA (100%) | MSA (70%) |
|---|---|---|
| 0 hrs | no skin irritation | immediate burning |
| ½ hrs | no skin irritation | small blisters |
| 1 hrs | no skin irritation | red skin irritation with large blisters Washing of the exposed skin with soap |
| 24 hrs | no skin irritation | scab formation |

MSA-UREA (100%) signifies an undiluted composition similar of Example 1 with no added inhibitors.

Elastomer Testing

When common sealing elements used in the oil and gas industry come in contact with acid compositions they tend to degrade or at least show sign of damage. A number of sealing elements common to the industry were exposed to a composition according to a preferred embodiment of the present invention to evaluate the impact of the latter on their integrity. More specifically, the hardening and drying and the loss of mechanical integrity of sealing elements can have substantial consequences to the operations of wells and result in undesirable shut downs to replace defective sealing elements. Testing was carried out to assess the impact of the exposure of composition of Example 2 to various elastomers. Table 9 reports the results of long term (72 hour) exposure elastomer testing on the concentrated product of Example 2 at 70° C. and 28,000 kPa. The elastomers showed little to no degradation. The elastomers tested included Nitrile 70®, Viton 75®, Aflas 80®, and EPDM 70 style sealing elements.

TABLE 9

Results of the Elastomer Testing

| Elastomer | Weight before/g | Weight after/g | Weight Change/g | Thickness before/g | Thickness after/g |
|---|---|---|---|---|---|
| Nitrile 70 | 2.1021 | 2.1494 | −0.0473 | 0.135 | 0.135 |
| AFLAS 80 | 2.8997 | 2.9092 | −0.0095 | 0.135 | 0.135 |
| VITON 75D | 3.0898 | 3.0954 | −0.0056 | 0.135 | 0.135 |
| EPDM 70D | 1.638 | 1.6481 | −0.0101 | 0.135 | 0.135 |

Properties

The formulation of Example 2 was analyzed and had the following physical and chemical properties at full strength and upon dilution by half.

TABLE 10

Various Physical and Chemical Properties of the Formulation of Example 1 at Full Strength and Upon Dilution by Half.

|  | Example 2 | Example 2 (50% dilution) |
|---|---|---|
| Appearance | Yellow liquid | Yellow liquid |
| Specific Gravity at 23° C. | 1.25 | 1.134 |
| Salinity, % | 46% | 23% |
| Odor | Slight | Slight |
| Freezing Point | MINUS 30° C. | MINUS 30° C. |
| Boiling Point | >100° C. | >100° C. |
| pH | −0.04 | 0.14 |

Corrosion Testing on Aluminum

Corrosion testing was carried out on aluminum coupons (density of 2.73 g/cc) at 55° C. for a period of 72 hours. The composition of Example 2 provided a substantial corrosion resistance improvement over a 15% composition of HCl and comparable corrosion resistance to methanesulfonic acid. The surface area of the coupons was 31.53 cm$^2$. The results are reported in Table 11. The result for aluminum corrosion was below the required 6.25 mm/year.

TABLE 11

Results of the Aluminum Corrosion test

| | Additional Additives | Initial weight (g) | Final weight (g) | Loss weight (g) | Mils/yr | Mm/year | Lb/ft2 |
|---|---|---|---|---|---|---|---|
| MSA (70%) | None | 6.2763 | 6.2582 | 0.018 | 10.07231 | 0.256 | 0.001 |
| MSA-UREA (100%) | 0.1% KI, 1% PP | 6.2728 | 6.1388 | 0.134 | 74.56847 | 1.894 | 0.009 |
| 15% HCl | none | 6.3114 | 0 | 6.311 | 3512.175 | 89.209 | 0.410 |

PP signifies propyn-1-ol complexed with methyloxirane
KI signifies Potassium Iodide

Corrosion Testing on Chrome Coupons

Corrosion testing was carried out on Chrome 13 coupons at 55° C. for a period of 72 hours. The composition of Example 2 provided an improvement in the corrosion resistance versus both the MSA and the 15% HCl compositions. The coupons had a surface area of 30.88 cm$^2$, and a density of 7.72 g/cc. The results of the test are reported in Table 12.

TABLE 12

Results of the Corrosion test on Chrome Coupons

| composition | Additives | Initial weight (g) | Final weight (g) | Loss weight (g) | Mils/yr | Mm/year | Lb/ft2 |
|---|---|---|---|---|---|---|---|
| MSA | None | 34.5027 | 33.9685 | 0.534 | 107.3362 | 2.726 | 0.035 |
| MSA-UREA (100%) | 0.1% KI 1% PP | 34.6426 | 34.4294 | 0.213 | 42.83804 | 1.088 | 0.014 |
| 15% HCl | none | 34.2636 | 22.7195 | 11.544 | 2319.543 | 58.916 | 0.767 |

PP signifies propyn-1-ol complexed with methyloxirane
KI signifies Potassium Iodide

Corrosion Testing on Chromed Stainless Steel Coupons

Corrosion testing was carried out on stainless steel coupons having a chromed surface at 55° C. for a period of 72 hours. The composition of Example 2 (MSA-UREA 100%+ additives) provided an improvement in the corrosion resistance versus both the MSA and the 15% HCl compositions. The surface area of the coupons was 33.22 cm$^2$, the density of the coupons was 7.86 g/cc. The results are reported in Table 13.

TABLE 13

Corrosion Test Results on Chromed Stainless Steel Coupons

| Additives | | Initial weight (g) | Final weight (g) | Loss weight (g) | Mils/yr | Mm/year | Lb/ft2 |
|---|---|---|---|---|---|---|---|
| MSA | None | 32.11 | 31.4169 | 0.693 | 127.1484 | 3.230 | 0.043 |
| MSA-UREA (100%) | 0.1% KI, 1% PP | 32.031 | 31.7052 | 0.326 | 59.76762 | 1.518 | 0.020 |
| 15% HCl | None | 32.1035 | 29.0324 | 3.071 | 563.3896 | 14.310 | 0.189 |

PP signifies propyn-1-ol complexed with methyloxirane
KI signifies Potassium Iodide The uses (or applications) of the compositions according to the present invention upon dilution thereof ranging from approximately 1 to 75% dilution are listed in Table 14 below and include, but are not limited to: injection/disposal treatments; matrix acid squeezes, soaks or bullheads; acid fracturing, acid washes; fracturing spearheads (breakdowns); pipeline scale treatments, cement breakdowns or perforation cleaning; pH control; and de-scaling applications.

TABLE 14

Applications for which compositions according to the present invention can be used as well as proposed dilution ranges

| Application | Suggested Dilution | Benefits |
|---|---|---|
| Injection/Disposal Wells | 50% | Compatible with mutual solvents and solvent blends, very cost effective. |
| Squeezes & Soaks Bullhead Annular | 33%-50% | Ease of storage and handling, cost effective compared to conventional acid stimulations. Ability to leave pump equipment in wellbore. |
| Acid Fracs | 50%-75% | Decreased shipping and storage compared to conventional acid, no blend separation issues, comprehensive spend rate encourages deeper formation penetration. |
| Frac Spearheads (Breakdowns) | 33%-66% | Able to adjust concentrations on the fly. Decreased shipping and storage on location. |
| Cement Breakdowns | 50% | Higher concentrations recommended due to lower temperatures, and reduced solubility of aged cement. |
| pH Control | 0.1%-1.0% | Used in a variety of applications to adjust pH level of water based systems. |
| Liner De-Scaling, Heavy Oil | 1%-5% | Continuous injection/de-scaling of slotted liners, typically at very high temperatures. |

While the foregoing invention has been described in some detail for purposes of clarity and understanding, it will be appreciated by those skilled in the relevant arts, once they have been made familiar with this disclosure, that various changes in form and detail can be made without departing from the true scope of the invention in the appended claims.

The invention claimed is:

1. A synthetic acid composition for use in oil industry activities, said composition comprising:
    water, urea and methanesulphonic acid, wherein no less than 97% of the weight of the composition is comprised of the water, the urea and the methanesulphonic acid and the urea and the methanesulphonic acid have a molar ratio of not less than 1.0:1;
    a metal iodide or iodate in an amount of no more than 1% by weight of the weight of the composition; and
    a corrosion inhibitor, wherein said corrosion inhibitor comprises—an alcohol or derivative thereof in an amount of no more than 1% by weight of the weight of the composition,
    wherein the synthetic acid composition has a pH less than 1.0 and a shelf life of greater than 12 months.

2. The synthetic acid composition according to claim 1, wherein the urea and the methanesulphonic acid are in a molar ratio of 1.2:1.

3. The synthetic acid composition according to claim 1, wherein the metal iodide or iodate is selected from the group consisting of: cuprous iodide; potassium iodide; sodium iodide; and lithium iodide.

4. The synthetic acid composition according to claim 1, wherein the metal iodide or iodate is potassium iodide.

5. The synthetic acid composition according to claim 1, wherein the alcohol or derivative thereof is an alkynyl alcohol or derivative thereof.

6. The synthetic acid composition according to claim 5, wherein the alkynyl alcohol or derivative thereof is propargyl alcohol or a derivative thereof.

7. The synthetic acid composition according to claim 6, wherein the alkynyl alcohol or derivative thereof is present in a concentration ranging from 0.01 to 1.0% w/w.

8. The synthetic acid composition according to claim 5, wherein the alkynyl alcohol or derivative thereof is present in a concentration ranging from 0.01 to 0.5% w/w.

9. The synthetic acid composition according to claim 5, wherein the alkynyl alcohol or derivative thereof is present in a concentration of 0.2% w/w.

10. The synthetic acid composition according to claim 1, wherein the metal iodide is present in a concentration ranging from 100 to 10000 ppm.

11. The synthetic acid composition according to claim 1, wherein the metal iodide is present in a concentration ranging from 100 to 5000 ppm.

12. The synthetic acid composition according to claim 1, wherein the metal iodide is present in a concentration of 1000 ppm.

13. The synthetic acid composition according to claim 1, wherein no less than 98.9% of the weight of the composition is comprised of the water, the urea and the methanesulphonic acid.

14. The synthetic acid composition according to claim 13 for use in solubilizing $CaCO_3$ from rock formations.

* * * * *

UNITED STATES PATENT AND TRADEMARK OFFICE
CERTIFICATE OF CORRECTION

PATENT NO. : 10,329,476 B2
APPLICATION NO. : 15/160467
DATED : June 25, 2019
INVENTOR(S) : Purdy et al.

Page 1 of 1

It is certified that error appears in the above-identified patent and that said Letters Patent is hereby corrected as shown below:

In the Claims

Column 18, Line 39 Claim 7: Delete "claim 6" and insert -- claim 5 --

Signed and Sealed this
Twentieth Day of August, 2019

Andrei Iancu
*Director of the United States Patent and Trademark Office*